Figure 1:
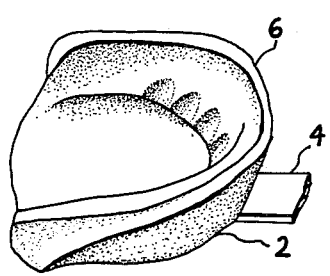

July 6, 1965  W. A. FRYREAR, JR  3,192,583
REMOVABLE PARTIAL DENTURE PROSTHESIS
Filed June 21, 1963  3 Sheets-Sheet 1

INVENTOR.
WILLIAM A. FRYREAR, JR.
BY
HIS ATTORNEY

July 6, 1965 W. A. FRYREAR, JR 3,192,583
REMOVABLE PARTIAL DENTURE PROSTHESIS
Filed June 21, 1963 3 Sheets-Sheet 2

INVENTOR.
WILLIAM A FRYREAR, JR.
BY
*Norman L. Wilson Jr*
HIS ATTONEY

July 6, 1965  W. A. FRYREAR, JR  3,192,583
REMOVABLE PARTIAL DENTURE PROSTHESIS
Filed June 21, 1963  3 Sheets-Sheet 3

INVENTOR.
WILLIAM A. FRYREAR, JR.
BY
HIS ATTORNEY

United States Patent Office 3,192,583
Patented July 6, 1965

3,192,583
REMOVABLE PARTIAL DENTURE PROSTHESIS
William A. Fryrear, Jr., 8220 St. Anthony Church Road, Louisville, Ky.
Filed June 21, 1963, Ser. No. 289,508
4 Claims. (Cl. 22—193)

This invention is concerned with removable partial denture prosthesis.

Dental prosthesis is the science and art of providing suitable substitutes for lost natural teeth. Partial denture prosthesis is the branch of prosthodontics which deals with the restoration of one or more but not all of the natural teeth. A removable partial denture is a dental appliance which may be entirely supported by teeth, entirely supported by tissue, or supported by a combination of the two, and which can be readily removed by the patient. This invention, in one of its embodiments, is concerned with the construction of removable partial dental prosthetic appliances.

Briefly, in partial denture prosthesis, an accurate pattern of the desired appliance framework is formed of a low melting material on a cast. Around this pattern a mold is formed of refractory material. Heat is then applied to burn out the pattern to eliminate it from the mold. This burn out leaves a cavity the shape of the desired appliance. A channel leading to this cavity is called a sprueway. Molten metal is forced into the sprueway and then into the cavity to form a metal reproduction of the original pattern.

For a full understanding of this invention however, a more complete explanation of partial denture prosthesis is now given in connection with the accompanying drawings.

In the drawings:

FIGURES 1 through 7 help to explain conventional prosthetic techniques.

FIGURES 8 through 13 illustrate my invention.

In dental prosthesis the dentist, having made a complete oral examination, and having decided that partial denture service best maintains remaining oral structures in the best possible condition for the longest time, takes an impression of the upper or maxillary, and lower or mandibulary teeth and adjacent tissues. The dentist's impression, called a functional impression, is an accurate registration of the anatomic form. It is taken with a material which is in a semi-fluid state at the time of introduction into the mouth, but which does not distort. Although plaster of Paris and wax have been used, a hydrocolloid is now generally employed.

There are two types of hydrocolloids, that is, colloids with water as the dispersion medium. The difference between the two is in the method by which the gel is formed in the mouth. The reversible hydrocolloid (agar-agar type) is heated in water to form a liquid which gels when cooled in the mouth. The irreversible hydrocolloid (alginate type) is dissolved in water. After a few minutes a chemical reaction takes place, forming the insoluble gel, calcium alginate. As shown in FIG. 1, either of these hydrocolloids is placed in tray 2 with handle 4 to form functional impression 6.

Figure 2:
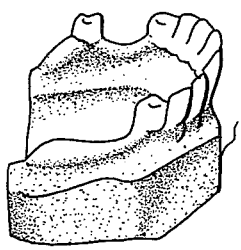

After removal of the functional impression from the mouth, it is dried and before it has had time to distort, the impression of the tissue and teeth is filled with an aqueous paste, such as gypsum, to form a cast 8 known as a master cast as shown in FIG. 2. A study of this master cast is made by the dentist to determine and design the type of appliance to be cast.

From the master cast other casts are made for use in casting and fitting the dental appliance. Duplication of the master cast is accomplished in the same way that the initial impression of the mouth is made. Usually a reversible hydrocolloid impression is made using diluted agar hydrocolloid. The impression is made in a metal flask.

After forming the impression, the master cast is removed and duplicated by filling the impression with a heat resistant hardening material called an investment. The investment used in making the refractory cast depends upon whether the appliance is to be cast from gold, a gold alloy, or from a chromium alloy such as chrome-cobalt. In the case of gold gypsum is normally used, whereas in the case of chrome-cobalt silica is employed. The investment powder is weighed, and water, measured according to the manufacturers directions, is added. The ratio of water to investing powder influences the strength of the mixture.

Figure 3:
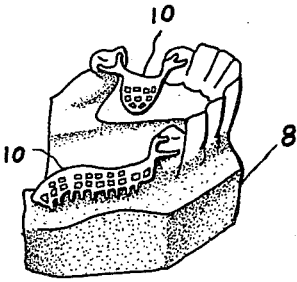
Figure 4:
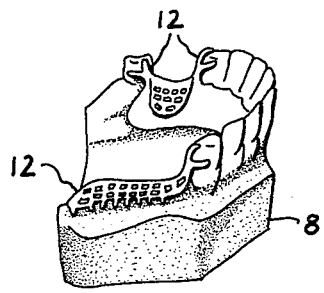

In making a removable partial prosthetic dental appliance, a wax or plastic pattern is made, and this pattern is replaced with the gold or chrome metal. Accordingly, after the refractory cast has set, in an oven or otherwise, and has been examined for possible defects, the design 10 of the dental appliance is lightly traced on the refractory cast as shown in FIG. 3. After the pattern is traced, if it was not transferred to the refractory cast from the master cast, an accurate pattern of the desired framework is formed from wax or plastic on the refractory cast. Forming the pattern is done freehand, and consists of applying soft or melted inlay or casting wax or plastic over the penciled design on the cast until the wax pattern has the desired thickness. Generally ready-made forms for clasps, rests, connectors and denture bases can be employed. FIG. 4 shows a refractory cast with the pattern 12 applied.

A sprue is a wax, plastic or metal form 14 which is attached to a pattern to form an aperture through which molten metal flows into a mold to make a casting. Since centrifugal force is responsible for the casting action, the molten metal should not move against this force when possible.

In most instances it is not possible to cast in the direction of the force. Hence adequate sprueways must be provided to insure that remote areas are reached. In addition a bulky portion of the mold should not be reached by a narrow, smaller passage. When a sprueway is too small, it will become blocked by congealed metal before sufficient metal has reached the larger passage beyond. Accordingly additional sprues are provided as shown in FIG. 5.

Figure 5:
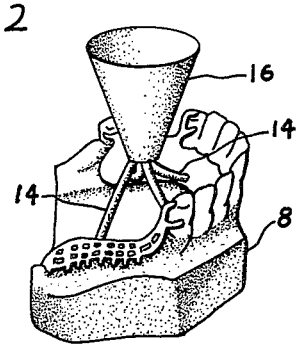
Figure 6:
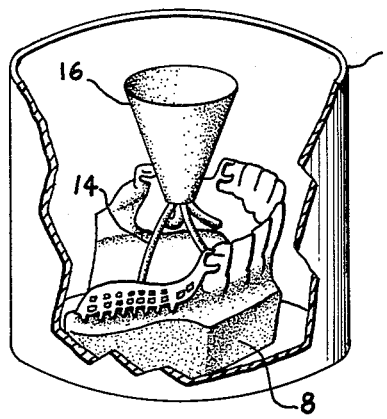
Figure 7:
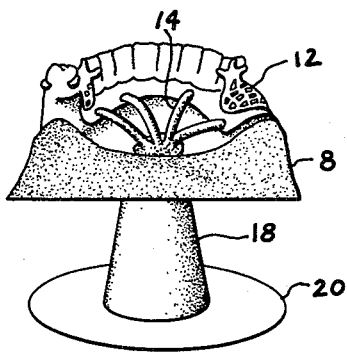

The two methods generally known for spruing patterns are top spruing as shown in FIGS. 5 and 6, and inverted spruing as shown in FIG. 7. Multiple sprues as shown are generally necessary as explained.

The refractory cast with its pattern to which sprues have been attached in next covered with a mixture of refractory material. This soft material hardens to form a mold into which the molten metal is forced after the wax or plastic pattern and sprues have been eliminated. The process of covering the cast and pattern with refractory material is termed investing. The refractory investing material is the same in composition as that from which the refractory cast was made. The investment is mixed with sufficient water to be soft enough to conform accurately to the configuration of the pattern. Investing is carried out in a casting ring, called an investing ring, which is hollow cylinder 19 as shown in FIG. 6. Investing ring 19 is used of such size that when invested, the pattern will be covered by at least one-fourth inch of investment material. There should also be that same distance between the top of the investment and the top of the investment ring. A wax pattern and cast with top spruing is placed in the investing ring to be covered with investment material as shown in FIG. 6. A sprue former 16 is either inserted over the sprues or the funnel shaped sprue cavity is cut in the investment after it has partially hardened. A cast and pattern with inverted spruing are positioned in the investing ring on a sprue former 18 on a base 20 shown in FIG. 7.

A sprue former is thus used to make a sprue cavity sufficiently large so that as the small areas cool and shrink, liquid metal filling the voids will be drawn from outside the pattern. For this reason sprues should be larger than pattern parts to which they are attached. After the sprue cavity is cut in the partially hardened investment, it is permitted to completely harden.

This invention, in one of its specfic aspects, pertains to a new investing process and improved casting methods.

Since centrifugal force is responsible for the casting action the molten metal should move in line with this force. The molten metal should not be made to take abrupt turns and, above all, the flowing metal should not have to reverse its direction. Ideally, the metal should flow in the most direct route by which it can reach the most remote part of the mold.

In addition to the fact that sprue channels should make gentle curves and easy turns, the number of sprues should be kept to a minimum. After casting, sprues are removed by cutting some distance from the dental appliance to insure not cutting the casting. Remaining portions of sprues must then be ground off with heatless stones. Accordingly it is extremely important to keep the sprue pattern as simple as possible in order to keep grinding and polishing time to a minimum.

An object of this invention is to provide investing means permitting the improved spruing technique to be used.

Another object of this invention is to provide a process whereby the sprue pattern is not only simplified, but results in a more direct path, permitting more accurate casting.

In removable partial denture prosthesis the refractory cast, having the pattern formed thereon, is usually placed in the investing ring in an upright position. It is extremely important for the pattern to be visible during the investing step. Hence when inverted spruing is used, the pattern is stood on the sprue former as shown in FIGURE 7. The pattern will then be in an upward visible position during investing. When this method is employed the sprue former is of such height that the cast is covered with the desired thickness of investment.

If top spruing is used the refractory cast with its pattern is placed in the bottom of the investment ring 14 as shown in FIGURE 6. With this technique the pattern is also visible during investing, insofar as sprue former 16 permits. However, top spruing is not as desirable since the hot molten metal must reverse its direction during casting. The created turbulence may lead to less accurately cast appliances.

Figure 9:
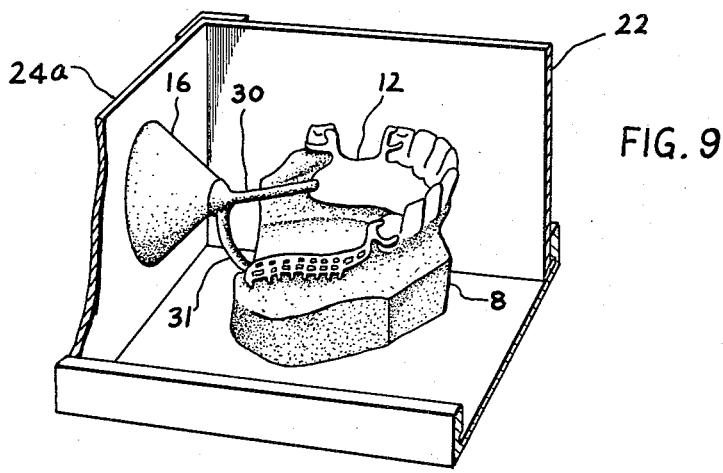
Figure 10:
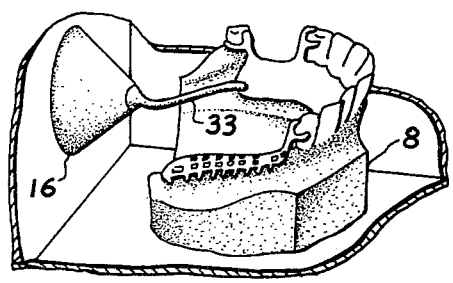

In accordance with this invention a process is provided which ovrecomes problems associated with either inverted or top spruing. By this invention a method is provided for using side sprues. By side spruing is meant a process wherein sprues are attached to the pattern in a plane substantially parallel to the refractory cast. In other words, in top spruing and inverted spruing the sprues are virtually perpendicular to the refractory cast as shown in FIGURES 6 and 7, whereas in side spruing the sprues are slightly above but parallel to a plane taken through the refractory cast as shown in FIGURES 9 and 10. One form of side spruing is posterior spruing which can best be understood by reference to FIGURE 9, showing two sprues 30 and 31, because of an intricate pattern. Anterior spruing, accomplished by drilling through the impression and attaching the sprue to that side of the pattern, can also be used by this invention when desired. Other types of side spruing can also be employed.

If side sprues have been used, such sprued patterns have been employed in combination with a double investing process. This technique involves painting the investment on the pattern with a brush, permitting this investment to harden, and then investing the thus painted cast in a cylindrical investing ring with the sprue in the upright position.

In accordance with this invention, therefore, an improvement in removable partial denture prosthesis is provided by placing a refractory cast, having a pattern for a removable partial dental appliance formed thereon with side spruing, in an investing box having a vertical surface adapted to receive a sprue former and investing the refractory cast in the horizontal position with the sprue in a sprue former and the pattern in an upward visible position in the investing box. The pattern is thus visible at all times during investing.

Figure 8:
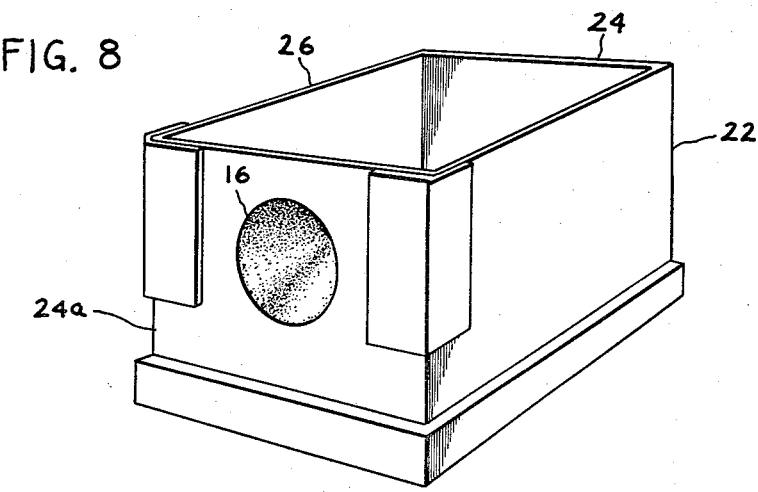

In its broad aspect the invention contemplates investing in the conventional casting ring if means are provided on a vertical surface for a sprue former. However the investing ring universally employed in denture prosthesis does not readily lend itself to the use of side sprued patterns. In one of its more specific embodiments, therefore, this invention provides a new type of investing form. Rather than an investing ring an investing box 22 is provided. In other words the investing form is a hollow right parallelepiped instead of the conventional hollow right cylinder. This invention encompassess an investing box 22 having (FIG. 11) sides 26, ends 24 and bottom 28 which can be dismantled. The box has an open top, one end 24a being adapted to receive a sprue former 16. In one form (FIG. 8) sides 26, ends 24 and bottom, capable of being dismantled, are held together by wax or other adhesive. In addition end 24a has a sprue former 16 permanently attached to the vertical surface thereof as shown in FIGURE 8. This contributes to the efficiency of the over-all process.

Figure 11:
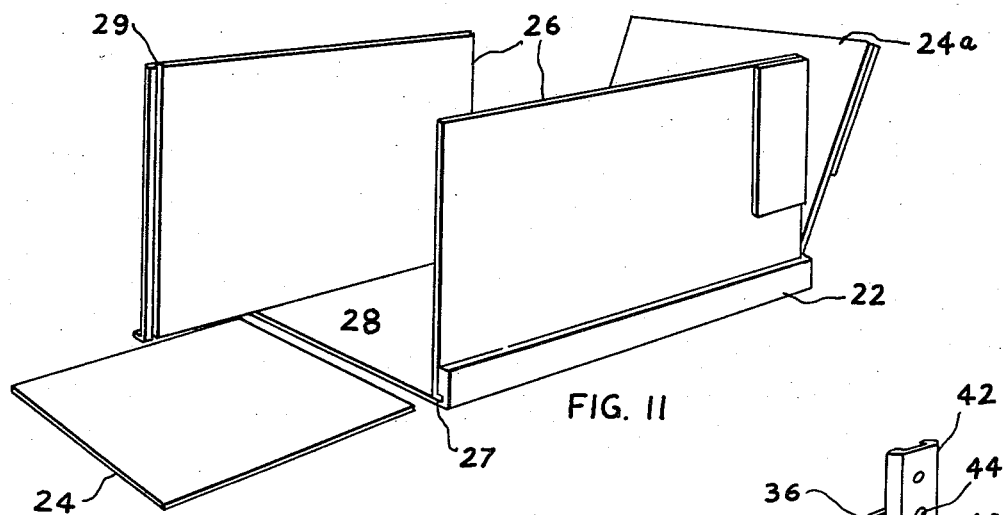
Figure 12:
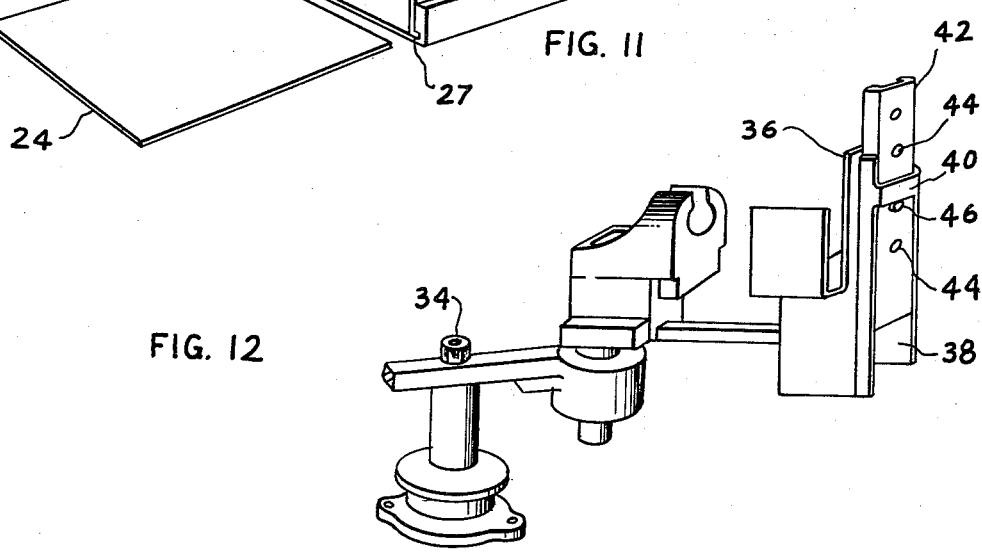
Figure 13:
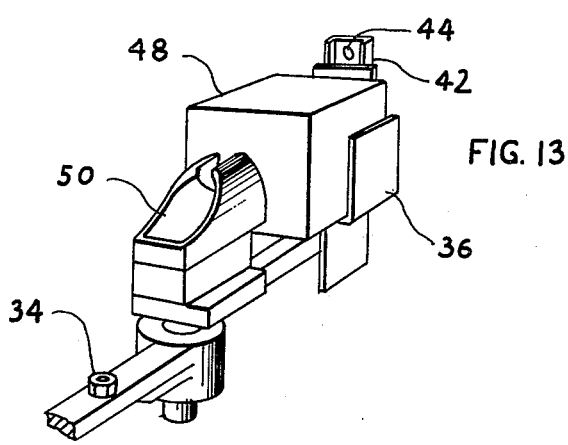

The investing box can also be assembled by sliding the ends 24 and sides 26 in grooves 27 and 29 (FIG. 11). It can be seen from FIGURE 9 that investing box 22 readily lends itself to investing refractory casts with side spruing. The refractory cast 8 with pattern 12, thereon with side sprues 30 and 31 attached, is placed in the investing box with the sprues in sprue former 16. The pattern is then invested in the usual manner on a vibrator. To insure sufficient strength when the hot metal is forced into the mold, the pattern is preferably partially invested. A reinforcing screen is inserted in the investing box and then covered with investment. After the investment hardens, the bottom and sides of the investing box are removed so that the investment can be withdrawn from the sprue former. The result is a block investment rather than a cylindrical investment as employed in the prior art.

Among the advantages of this invention is that it provides a process for always casting in accordance with the principles of physics. By prior art methods there was always at least an upward component of force necessary, and in some instances even a backward component. Such changes in direction obviously lead to less accurately cast appliances. As can be seen from FIG. 10, if the cast is spinning in a counter clockwise direction, only a single sprue 33 is required instead of four sprues as shown in FIGS. 5, 6 and 7. In addition, by the process of this invention it is not necessary that sprues be larger than the pattern as in the prior art processes where casting is not in strict compliance with centrifugal force components.

As mentioned hereinbefore, after the pattern is burned out, hot metal is centrifugally forced into the mold using a centrifugal casting machine. Inasmuch as conventional casting machines are adapted to receive only cylindrical investments, this invention also encompasses the provision of a cradle 36. This cradle is provided with a shaft 38 and collar 40 adapted to fit over an upstanding leg 42 of a conventional casting machine 34. The leg 42 has a plurality of vertically extending apertures 44 therein for the selective reception of a pin 46 of cradle 36. A block investment is shown as 48 in FIG. 13. The molten metal, at about the temperature of the investment block 48 is centrifugally forced into the channels and cavities around the master cast from crucible 50.

An important advantage of this invention is that in addition to a more perfect casting, finishing and polishing times are greatly decreased. Removal of sprues and polishing of sprue points accounts for most of the finishing time in dental prosthesis. This process allows for fewer sprues. Other advantages and ramifications will occur to one skilled in the art in the light of my invention. Such variations are deemed to be within the scope of this invention.

What is claimed is:

1. In removable partial denture prosthesis, the improvement which comprises forming a pattern on a refractory cast for a removable partial dental appliance, attaching a side sprue to said pattern, placing the refractory cast in an investing form with the sprue in the horizontal position and the pattern in an upward visible position, investing the refractory cast and the pattern thereon, providing a funneled sprue in communication with the end of the sprue, hardening the investment, burning out the pattern and sprue, and centrifugally injecting molten dental metal into the mold to form the dental appliance.

2. In removable partial denture prosthesis the improvement which comprises placing a refractory cast having formed thereon a pattern for a removable partial dental appliance with a sprue extending posteriorly therefrom in a plane substantially parallel to a plane taken through the refractory cast, in an investing box open at the top, having sides, ends and bottom which can be dismantled, with one end containing a sprue former, investing the refractory cast with the sprue in the sprue former and the pattern in an upward visible position in the investing box, and dismantling the investing box whereby the investment can be placed in a centrifugal casting machine with the sprues in a horizontal position.

3. In removable partial denture prosthesis the improvement which comprises investing a refractory dental cast having formed thereon a pattern for a removable partial dental appliance with spruing extending posteriorly from the pattern in a plane substantially parallel to a plane taken through the refractory cast, in an investing box open at the top, having sides, ends and bottom capable of being dismantled, and a sprue former attached to one end, said refractory cast being placed in the investing box with spruing in the horizontal position terminating in the sprue former and the pattern in an upward visible position, said investing box being dismantled whereby the investment can be placed in a centrifugal casting machine with the sprues in a horizontal position.

4. In removable partial denture prosthesis, the improvement which comprises placing a refractory cast, having a pattern for a removable partial dental appliance formed thereon with a sprue in a plane substantially parallel to a plane taken through the refractory cast, in an investing box open at the top, having sides, ends and bottom capable of being dismantled, and a sprue former attached to one end, partially investing the refractory cast with the refractory cast, the pattern and the sprue attached thereto in the horizontal position with the sprue in the sprue former and the pattern in an upward visible position in the investing box, inserting a reinforcing screen over said investment, completing the investing, removing the investing box from the outside of the hardened investment leaving a cubical investment, and casting said cubical investment in a centrifugal casting machine adapted to receive a cube.

References Cited by the Examiner
UNITED STATES PATENTS

| | | | |
|---|---|---|---|
| 483,596 | 10/62 | Baugh | 22—106 |
| 926,037 | 6/09 | Trachy | 22—69.1 |
| 1,368,689 | 2/21 | Bradley | 22—111 |
| 1,767,351 | 6/30 | Dalton et al. | 22—190.1 |
| 2,287,509 | 6/42 | Berger | 22—65.1 |
| 2,637,079 | 5/53 | Kemppe | 22—196 |
| 2,749,585 | 6/56 | Prosen | 22—65.1 |
| 3,082,493 | 3/63 | Boutet | 22—101 |

MARCUS U. LYONS, *Primary Examiner.*